(12) United States Patent
Horiguchi et al.

(10) Patent No.: US 8,220,856 B2
(45) Date of Patent: Jul. 17, 2012

(54) VEHICLE SEAT

(75) Inventors: Kenji Horiguchi, Kariya (JP); Hideki Kinoshita, Kariya (JP); Yasuo Suga, Kariya (JP); Nobuyuki Bandou, Kariya (JP); Kazuhiro Hibi, Kariya (JP)

(73) Assignee: Toyota Shatai Kabushiki Kaisha, Aichi-ken (JP)

( * ) Notice: Subject to any disclaimer, the term of this patent is extended or adjusted under 35 U.S.C. 154(b) by 192 days.

(21) Appl. No.: 12/439,125

(22) PCT Filed: May 25, 2007

(86) PCT No.: PCT/JP2007/060680
§ 371 (c)(1),
(2), (4) Date: Oct. 4, 2010

(87) PCT Pub. No.: WO2008/032475
PCT Pub. Date: Mar. 20, 2008

(65) Prior Publication Data
US 2011/0018324 A1    Jan. 27, 2011

(30) Foreign Application Priority Data

Sep. 11, 2006  (JP) .................................. 2006-245446

(51) Int. Cl.
*B60N 2/14* (2006.01)
(52) U.S. Cl. .............. 296/65.18; 296/65.01; 297/344.23
(58) Field of Classification Search ............... 296/65.12, 296/65.01, 65.15, 65.18, 65.06; 297/344.21, 297/344.22, 344.23, 344.24
See application file for complete search history.

(56) References Cited

U.S. PATENT DOCUMENTS

| | | | | |
|---|---|---|---|---|
| 4,600,239 A | * | 7/1986 | Gerstein et al. | 297/344.23 |
| 4,802,706 A | * | 2/1989 | Onimaru et al. | 296/68 |
| 4,969,685 A | * | 11/1990 | Chihaya et al. | 297/344.23 |
| 6,557,919 B2 | * | 5/2003 | Suga et al. | 296/65.07 |
| 6,572,172 B1 | * | 6/2003 | Ninomiya et al. | 296/65.12 |
| 7,845,703 B2 | * | 12/2010 | Panzarella et al. | 296/65.11 |
| 7,850,242 B2 | * | 12/2010 | Taguchi et al. | 297/344.24 |
| 8,033,605 B2 | * | 10/2011 | Miura et al. | 297/344.14 |
| 2007/0222267 A1 | * | 9/2007 | Tsujimoto et al. | 297/344.24 |
| 2009/0184554 A1 | * | 7/2009 | Paing et al. | 297/358 |

FOREIGN PATENT DOCUMENTS

| | | |
|---|---|---|
| JP | 2001-97081 A | 4/2001 |
| JP | 2004-123044 A | 4/2004 |

* cited by examiner

*Primary Examiner* — Jason S Morrow
(74) *Attorney, Agent, or Firm* — Patterson Thuente Christensen Pedersen, P.A.

(57) ABSTRACT

A mechanism for rotating a vehicle seat body and a mechanism for restraining rotation of the seat body are partially shared, reducing the number of parts. The seat includes a seat body, a seat rotation mechanism, a gear forming member having a rotation gear, a drive gear meshable with the rotation gear, and an actuator for rotating the drive gear. The seat further includes a moving mechanism that relatively moves the drive gear and the gear forming member in a direction of a rotation restraint position such that the drive gear is placed in such a position so as to interfere with the gear forming member when the seat body rotates to a first position and when the seat body is urged to rotate in a direction of a second position while the drive gear is in such a position so as to not mesh with the rotation gear.

6 Claims, 8 Drawing Sheets

VEHICLE SEAT

TECHNICAL FIELD

The present invention relates to a vehicle seat that is capable of rotating a seat body substantially horizontally between a first position and a second position.

BACKGROUND ART

Various types of vehicle seats are proposed as the vehicle seat described above.

For example, as shown in FIG. 10, a vehicle seat described in Patent Document 1 includes a seat rotation mechanism 91 that supports a seat body 94 on a vehicle floor such that the seat body 94 is capable of rotating between a forwardly facing position in which the seat body faces forwardly with respect to a vehicle and a laterally facing position in which the seat body faces laterally with respect to the vehicle, and a drive mechanism 92 that rotates said seat body 94.

Further, the vehicle seat further includes a rotation restraining mechanism 100 that is capable of restraining rotation of the seat body 94 and removing the restraint in a condition that the seat body 94 is rotated to the forwardly facing position or the laterally facing position. The rotation restraining mechanism 100 includes lock plates 105a and 105b that are fixed to predetermined positions on a vehicle floor side, and a lock member 104 that is fixed to the seat body 94 side. The lock member 104 is capable of engaging the lock plates 105a and 105b when the seat body 94 is rotated to the forwardly facing position or the laterally facing position. Further, provided on the seat body 94 side are an unlocking motor 107 and an operation wire 108. The operation wire 108 transmits motion of the unlocking motor 107 to the lock member 104, so as to move the lock member 104 in an unlocking direction.

Patent Document 1: Japanese Laid-Open Patent Application No. 2001-97081

DISCLOSURE OF THE INVENTION

Problem to be Solved by the Invention

The vehicle seat described above includes the rotation restraining mechanism 100 in addition to the seat rotation mechanism 91 and the drive mechanism 92. Further, said rotation restraining mechanism 100 is composed of the lock plates 105a and 105b, the lock member 104, the unlocking motor 107, the operation wire 108 and other components. That is, the rotation restraining mechanism is composed of a large number of parts. This may lead to an increased cost of the vehicle seat.

The present invention has been made in order to solve the above-mentioned problem. It is an object of the present invention to enable a mechanism for rotating the seat body and a mechanism for restraining rotation of the seat body to be partially shared, thereby reducing the number of parts of the vehicle seat.

Means for Solving the Problem

The above-mentioned object is solved by the invention of each of the claims.

A first invention provides a vehicle seat which includes a seat body, a seat rotation mechanism supporting the seat body on a vehicle floor such that the seat body is capable of substantially horizontally rotating between a first position and a second position, a gear forming member having an arcuate rotation gear that is arranged such that an arc center thereof corresponds to a rotation center of said seat body, a drive gear that is capable of meshing with the rotation gear, and an actuator for rotating the drive gear. Said gear forming member is provided to one of a rotational portion of a seat body side and a stationary portion of a vehicle floor side which portions are capable of rotating relative to each other when the seat body is rotated. Said drive gear is provided to the other of the rotational portion and the stationary portion. The seat body is capable of rotating when said drive gear and said gear forming member are relatively rotated upon rotation of said drive gear. The vehicle seat further includes a moving mechanism. The moving mechanism is capable of relatively moving said drive gear and said gear forming member in a direction of a rotation restraint position such that said drive gear is placed in such a position so as to interfere with said gear forming member when said seat body rotates to said first position and when said seat body is urged to rotate in a direction of said second position while said drive gear is placed in such a position so as to not mesh with the rotation gear.

According to the present invention, when the seat body rotates to said first position, the drive gear and the gear forming member relatively move in the direction of the rotation restraint position by means of the moving mechanism. That is, when the seat body is urged to rotate in a direction of the second position while the drive gear is placed in the position that the drive gear does not mesh with the rotation gear, the drive gear is maintained in such a position so as to interfere with the gear forming member. In this way, said drive gear interferes with the gear forming member, thereby restraining rotation of the seat body.

Thus, the mechanism for rotating the seat body and the mechanism for restraining rotation of the seat body can be partially shared, so that the number of parts of the vehicle seat can be reduced. This may lead to reduced costs of the vehicle seat.

In a second invention, the moving mechanism includes a gear rotation mechanism that rotatably supports said gear forming member such that the gear forming member can rotate between a seat rotation position in which an arc center of said rotation gear corresponds to said rotation center and a rotation restraint position in which the gear forming member interferes with said drive gear, and an arcuate rotation restraining gear that is formed in said gear forming member so as to be continuous with said rotation gear. The rotation restraining gear has an arc center that corresponds to a rotation center of said gear forming member, so as to mesh with said drive gear when said seat body rotates to said first position. Said rotation restraining gear is capable of rotating between said seat rotation position and said rotation restraint position when said drive gear is rotated while the drive gear meshes with said rotation restraining gear.

Thus, the drive gear can be used as a drive source of the moving mechanism.

In a third invention, one of the rotational portion and the stationary portion having the drive gear is provided with an engagement portion. When the seat body is urged to rotate toward the second position while the gear forming member is in the rotation restraint position, the engagement portion engages said gear forming member, thereby restraining rotation of said seat body.

Thus, if a rotational impact is applied to the gear forming member and related components toward the second position in a condition that the seat body is in the first position, the impact cannot be easily applied to the drive gear because said gear forming member and said engagement portion engage with each other.

In a fourth invention, the vehicle seat further includes a movable member that is attached to one of the rotational portion and the stationary portion having the gear forming member, and a stationary member that is attached to the other of the rotational portion and the stationary portion having the drive gear. When said seat body rotates to said first position and said gear forming member moves in the direction of the rotation restraint position with respect to said drive gear by movement of said moving mechanism, said movable member moves together with said gear forming member and is placed in such a position so as to be capable of engaging said stationary member in a rotation direction of the seat body.

According to the present invention, when the gear forming member moves in the direction of the rotation restraint position with respect to the drive gear by the movement of the moving mechanism, the movable member moves together with the gear forming member and is placed in such a position so as to be capable of engaging said stationary member. As a result, if a rotational force is applied to the seat body, for example, when collision of the vehicle happens, the movable member engages the stationary member, so that rotation of the rotational portion and the seat body with respect to the stationary member is reliably locked.

In a fifth invention, the movable member is connected to said gear forming member while the movable member applied with a resilient force in a direction toward the position in which the movable member is capable of engaging said stationary member. When said gear forming member moves in the direction of the rotation restraint position, said gear forming member moves in a direction of the resilient force, thereby moving said movable member to a position in which the movable member is capable of engaging said stationary member. When said gear forming member continues to move in the direction of the rotation restraint position with respect to said movable member that reaches the position in which the movable member is capable of engaging said stationary member and is maintained in the position, said gear forming member is spaced from said movable member so that a non-contact condition can be formed.

Thus, when the gear forming member is in the rotation restraint position, the gear forming member is maintained in the non-contact condition with respect to the movable member that is placed in such a position so as to be capable of engaging the stationary member. Thus, if a collision load is applied to the gear forming member via the seat body, for example, when the collision of the vehicle happens, movement of the gear forming member is not transmitted to the movable member. Thus, when the collision or the like of the vehicle happens, there is no defect that the movable member is disengaged from the stationary member by the movement of said gear forming member.

In a sixth invention, the movable member is attached to said rotational portion. Said stationary member is attached to said stationary portion. A bracket is secured to said stationary portion. The bracket covers the movable member from above so as to not preclude movement of said movable member and supports said stationary member.

Thus, if the rotational portion is applied with a force that urges to move the rotational portion upwardly with respect to the stationary portion, for example, when the collision of the vehicle happens, the movable member provided on the rotational portion side is held down by the bracket provided on the stationary portion side, so that the rotational portion and the seat body can be prevented from moving upwardly.

Effects of the Invention

According to the present invention, the mechanism for rotating the seat body and the mechanism for restraining rotation of the seat body can be partially shared, so that the number of parts of the vehicle seat can be reduced. This may lead to reduced costs of the vehicle seat.

DESCRIPTION OF SYMBOLS

Figure 1:
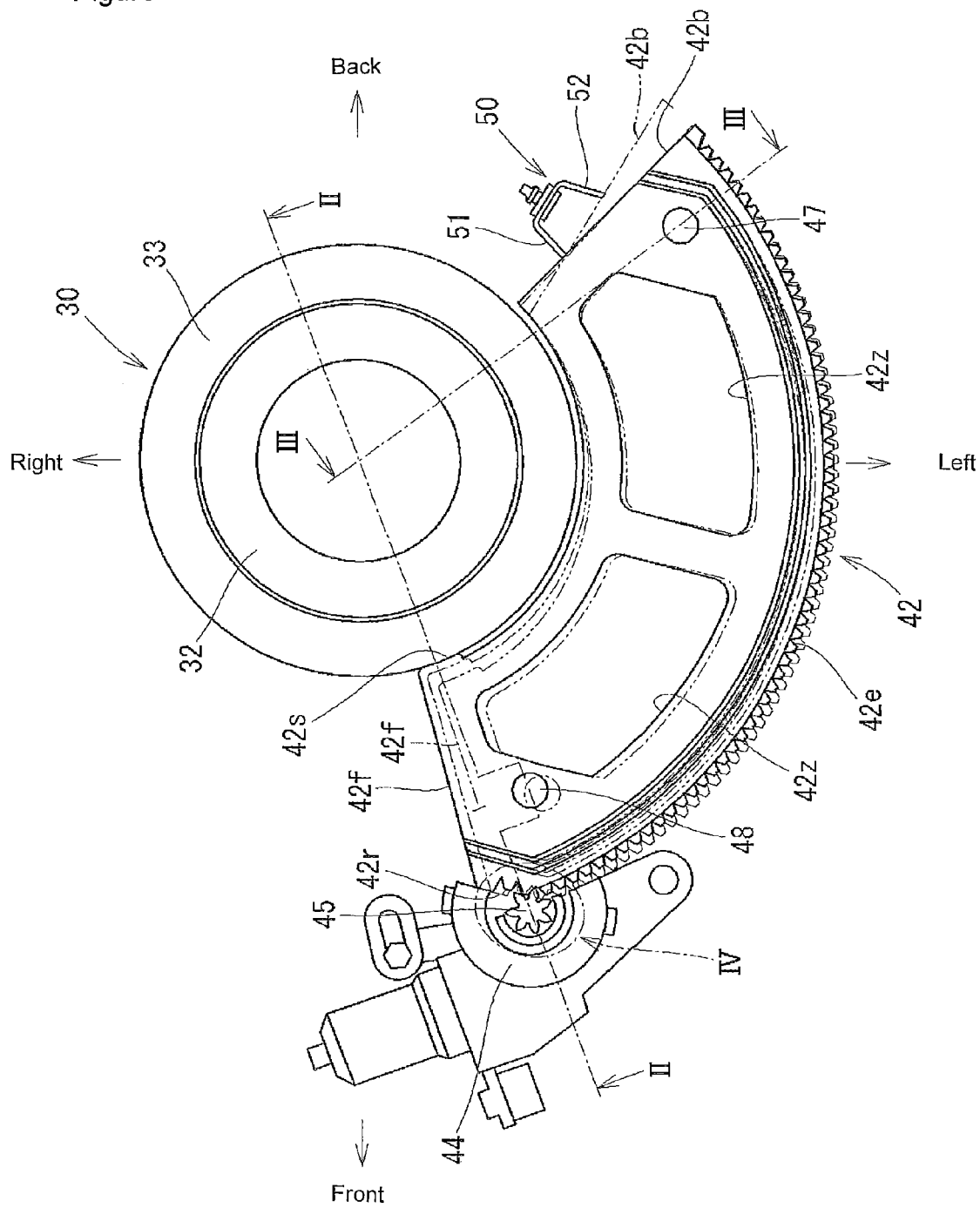
FIG. 1 is a plan view of a seat rotation mechanism and related components of a vehicle seat according to Embodiment 1 of the present invention.

10 . . . seat body
22 . . . slide table (stationary portion of vehicle floor side)
22$k$ . . . engagement portion
30 . . . seat rotation mechanism
35 . . . rotation table (rotational portion of seat body side)
42 . . . gear forming member
42$e$ . . . rotation gear
42$r$ . . . rotation restraining gear (moving mechanism)
44 . . . rotation motor (actuator)
45 . . . drive gear (moving mechanism)
47 . . . stationary pin (gear rotation mechanism, moving mechanism)
48 . . . movable pin (gear rotation mechanism, moving mechanism, a portion of gear forming member)
60 . . . rotation lock mechanism
62 . . . movable member
63 . . . pin opening
65 . . . stationary member
66 . . . spring
69 . . . bracket

BEST MODE FOR CARRYING OUT THE INVENTION

In the following, vehicle seats according to Embodiment 1 and Embodiment 2 of the present invention are described with reference to the drawings.

Embodiment 1

Figure 2:
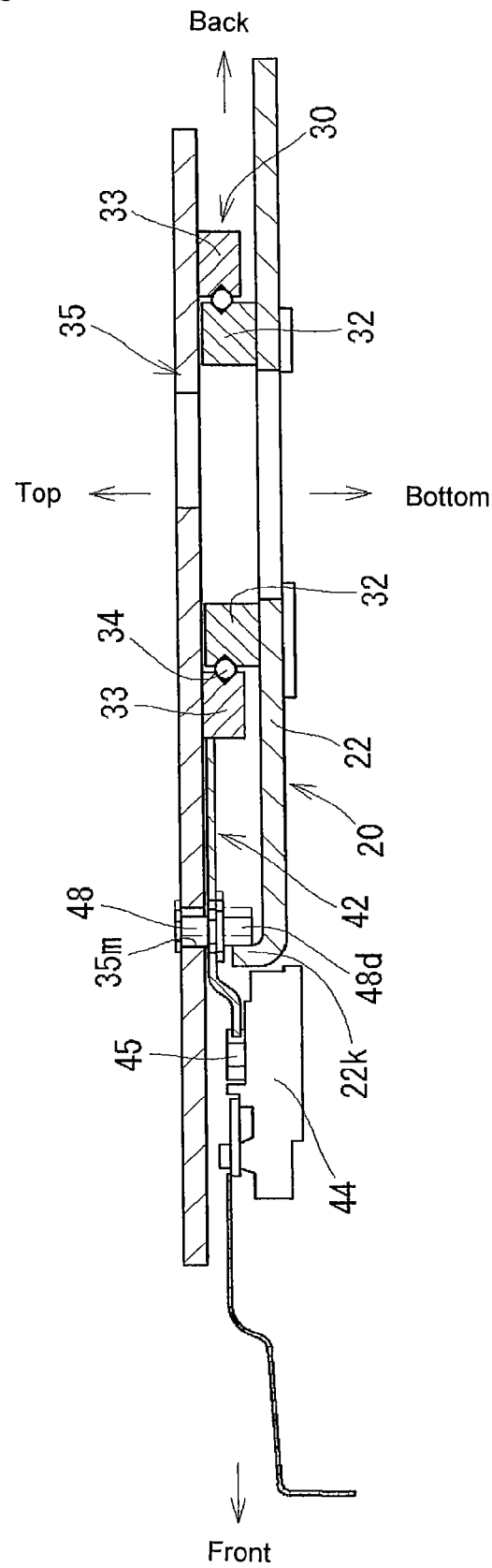
FIG. 2 is a longitudinal sectional view taken along line II-II of FIG. 1, which is viewed in a direction of arrows.
Figure 3:
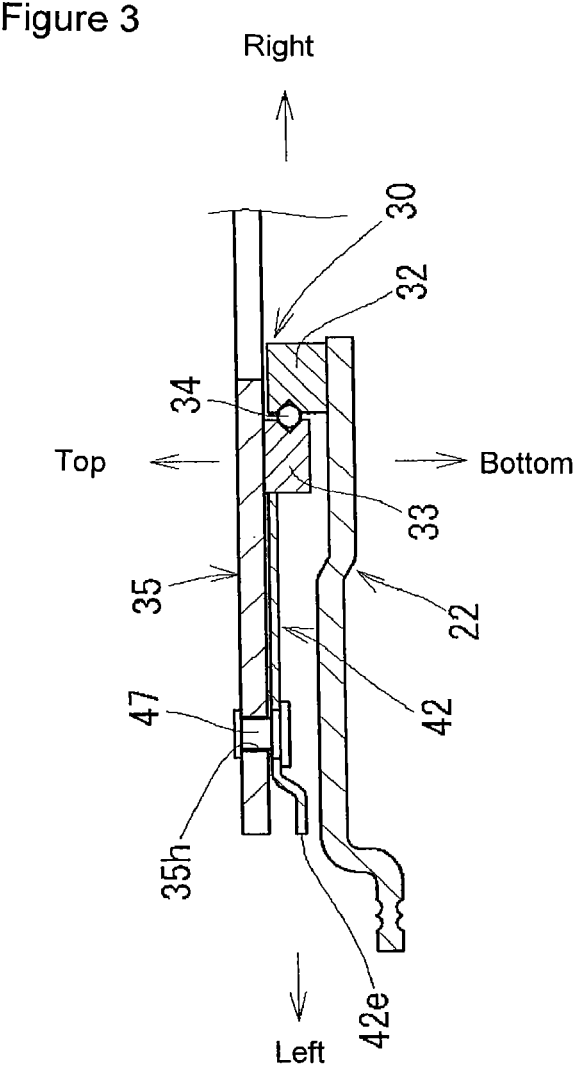
FIG. 3 is a longitudinal sectional view taken along line of FIG. 1, which is viewed in a direction of arrows.
Figure 4:
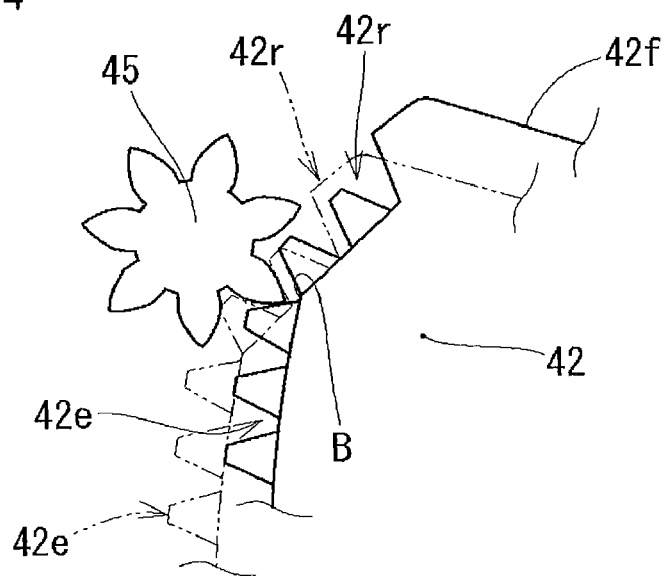
FIG. 4 is an enlarged view of a portion shown by arrow IV of FIG. 1.
Figure 5:
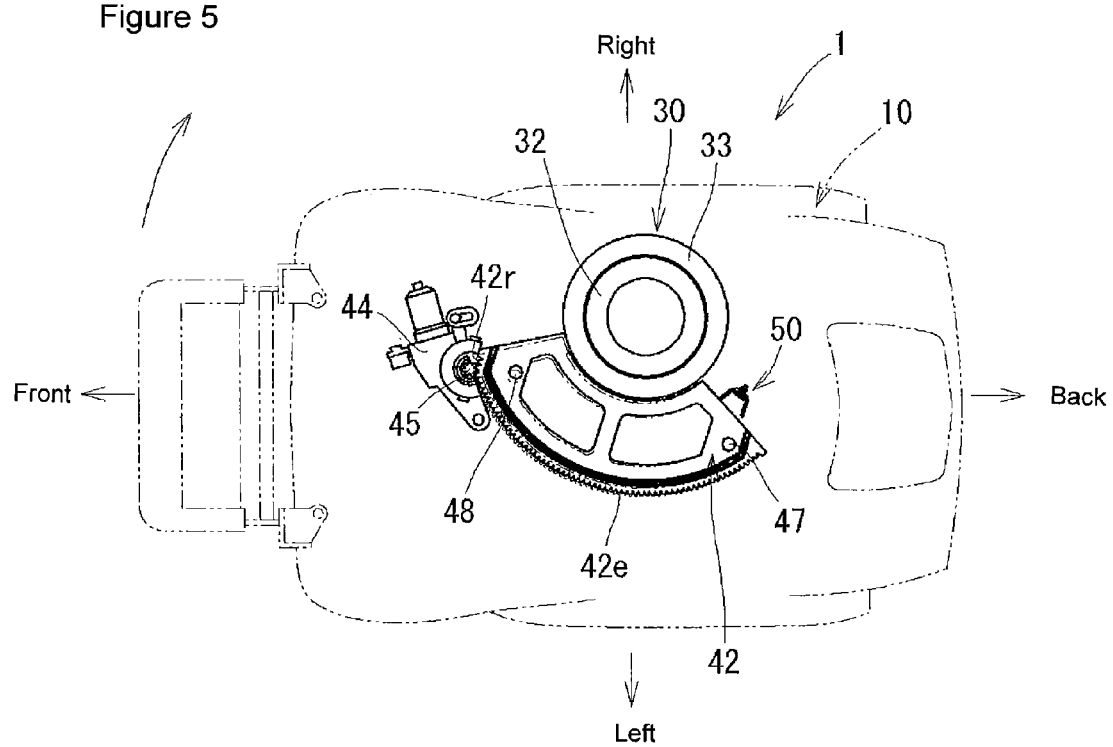
FIG. 5 is a whole schematic plan view of the vehicle seat.

In the following, the vehicle seat according to Embodiment 1 of the present invention is described with reference to FIGS. 1 to 5. FIG. 1 is a plan view of a seat rotation mechanism and related components of a vehicle seat according to this embodiment. FIG. 2 is a longitudinal sectional view taken along line II-II of FIG. 1, which is viewed in a direction of arrows. FIG. 3 is a longitudinal sectional view taken along line of FIG. 1, which is viewed in a direction of arrow. FIG. 4 is an enlarged view of a portion shown by arrow IV of FIG. 1. FIG. 5 is a whole schematic plan view of the vehicle seat.

Further, forward and rearward, rightward and leftward, and upward and downward in the drawings respectively correspond to forward and rearward, rightward and leftward, and upward and downward of a vehicle.

<Regarding Outline of Vehicle Seat>

As shown in FIG. 5, a vehicle seat 1 of this embodiment has a seat body 10, a longitudinal moving mechanism 20 (FIG. 2) that is capable of longitudinally moving the seat body 10 within a predetermined range on a vehicle floor, and a seat rotation mechanism 30 that is capable of supporting the seat body 10 so as to horizontally rotate the seat body 10 between a forwardly facing position in which the seat body faces forwardly with respect to a vehicle and a laterally facing position (a rightwardly facing position) in which the seat body faces laterally with respect to the vehicle.

The longitudinal moving mechanism 20 includes a pair of right and left stationary rails (not shown) that are secured to the vehicle floor, and a slide table 22 (FIG. 2) that is capable of longitudinally sliding along the stationary rails. Further, attached to the vehicle floor is a slide motor (not shown) that can function as a drive source of the longitudinal moving mechanism 20.

Said seat rotation mechanism 30 is disposed on the slide table 22 of the longitudinal moving mechanism 20.

The seat rotation mechanism 30 has an inner ring 32 and an outer ring 33 that are capable of rotating relative to each other. The inner ring 32 has a V-shaped groove that is circumferentially formed in an outer surface thereof. The outer ring 33 has a V-shaped groove that is circumferentially formed in an inner surface thereof. A large number of steel balls 34 (FIGS. 2 and 3) are disposed between the V-shaped grooves of the inner and outer rings 32 and 33. As a result, the outer ring 33 is capable of smoothly rotating relative to the inner ring 32 without rattling.

The inner ring 32 of the seat rotation mechanism 30 is secured to the slide table 22, and a rotation table 35 thereof is disposed on the outer ring 33. Further, the seat body 10 is disposed on the rotation table 35.

That is, the vehicle floor, the stationary rails of the longitudinal moving mechanism 20, the slide table 22 and other elements that do not rotate when the seat body 10 rotates correspond to a stationary portion of a vehicle floor side. Conversely, the outer ring 33, the rotation table 35 and other elements that rotate together with the seat body 10 correspond to a rotational portion of a seat body side of the present invention.

<Regarding Gear Forming Member 42, Drive Gear 45 and Other Elements>

Next, a gear forming member 42, a drive gear 45 and other elements that is capable of rotating the outer ring 33 relative to the inner ring 32 of the seat rotation mechanism 30 are described.

As shown in FIGS. 2 and 3, the gear forming member 42 is a plate-shaped member that is connected to the rotation table 35 while superimposed on a lower surface of the rotation table 35. As shown in FIGS. 1 and 5, the gear forming member 42 is shaped to a substantially arcuate shape having a predetermined width in a radial direction. The gear forming member 42 is positioned along an outer periphery of the outer ring 33. Further, a peripheral surface of the gear forming member 42 includes an inner surface portion that is positioned closer to an arc center of the gear forming member 42 in the radial direction and having an arcuate shape in a plan view, an outer surface portion that is positioned opposite to the inner surface portion, and side end surface portions that are positioned at both ends in a circumferential direction. Each of the side end surface portions extends radially and has a linear shape in a plan view. The gear forming member 42 has a stationary pin 47 and a movable pin 48. The stationary pin 47 is disposed at a portion closer to the outer surface portion and closer to the side end surface portion 42b that forms a rear side end surface portion when the seat body 10 is in the forwardly facing position (FIGS. 1 and 5). Conversely, the movable pin 48 is disposed at a portion closer to the outer surface portion and closer to the side end surface portion 42f that forms a front side end surface portion when the seat body 10 is in the forwardly facing position. Further, as shown in FIG. 3, the stationary pin 47 is inserted into and retained in a through hole 35h of the rotation table 35, so that the gear forming member 42 is rotatably connected to the rotation table 35. Further, as shown in FIG. 2, the movable pin 48 of the gear forming member 42 is inserted into and retained in an arcuately elongated through hole 35m of the rotation table 35. The arcuately elongated hole 35m has an arc center that corresponds to a center of the stationary pin 47. Thus, the gear forming member 42 is rotatable about the stationary pin 47 with respect to the rotation table 35 by an amount corresponding to the length of the arcuately elongated hole 35m.

Formed in the outer surface portion of the gear forming member 42 is an arcuate rotation gear 42e that extends from the side end surface portion 42b of the gear forming member 42 to a portion closer to the side end surface portion 42f thereof. That is, the arcuate rotation gear 42e is formed so as to extend from a position that forms the rear side end surface portion when the seat body 10 is in the forwardly facing position (FIGS. 1 and 5) to a portion closer to a position that forms the rear side end surface portion when the seat body 10 is in the forwardly facing position. Further, an arcuate rotation restraining gear 42r is formed in the outer surface portion of the gear forming member 42 so as to be continuous with the rotation gear 42e. The arcuate rotation retaining gear 42r is formed so as to extend to the side end surface portion 42f (the front side end surface portion) of the gear forming member 42.

As shown in FIG. 4, in a boundary portion between the rotation gear 42e and the rotation restraining gear 42r, their roots B contact with each other such that a drive gear 45 (which will be described hereinafter) can smoothly move between the gears 42e and 42r.

Further, as shown in FIG. 1, a positioning surface 42s is formed in the inner surface portion of the gear forming member 42. The positioning surface 42s is positioned adjacent to the side end surface portion 42f (the front side end surface portion). The positioning surface 42s is arranged to be capable of contact an outer surface of the outer ring 33 of the seat rotation mechanism 30. Further, when the positioning surface 42s of the gear forming member 42 contacts the outer surface of said outer ring 33, an arc center of the arcuate rotation gear 42e corresponds to a rotation center of the outer ring 33 (a rotation center of the seat body 10).

Further, the arcuate rotation restraining gear 42r that is continuous with the rotation gear 42e is constructed such that an arc center thereof corresponds to the center of the stationary pin 47

Further, formed in front and rear portions of the gear forming member 42 are openings 42z for reduction in weight.

As shown in FIGS. 1 and 2, the drive gear 45 that is capable of meshing with the rotation gear 42e or the rotation restraining gear 42r of the gear forming member 42, and a rotation motor 44 that is capable of rotating the drive gear 45, are respectively disposed on the slide table 22 to which the inner ring 32 of the seat rotation mechanism 30 is secured. A distance between the rotation center of the outer ring 33 and a rotation center of the drive gear 45 is determined such that the drive gear 45 can mesh with the rotation gear 42e in a condition that the positioning surface 42s of the gear forming member 42 contacts the outer ring 33 of the seat rotation mechanism 30. That is, when the drive gear 45 meshes with the rotation gear 42e, the arc center of the rotation gear 42e corresponds to the rotation center of the outer ring 33 (the rotation center of the seat body 10). Thus, in the meshing condition described above, when the drive gear 45 rotates counterclockwise as seen in FIG. 1, the gear forming member 42 and the outer ring 33 of the seat rotation mechanism 30 rotate clockwise around the inner ring 32 by a rotational force of the drive gear 45, so that the seat body 10 rotates clockwise together with the rotation table 35. When the drive gear 45 rotates clockwise while the drive gear 45 meshes with the rotation gear 42e, the gear forming member 42 and the outer ring 33 of the seat rotation mechanism 30 rotate counterclockwise around the inner ring 32 by the rotational force of the drive gear 45, so that the seat body 10 rotates counterclockwise together with the rotation table 35.

Further, upon clockwise rotation of the drive gear 45, the gear forming member 42, the seat body 10 and other components rotate counterclockwise, the seat body 10 is returned to the forwardly facing position (a counterclockwise rotation limit position) in a condition that the drive gear 45 is moved to the boundary position between the rotation gear 42e and the rotation restraining gear 42r of the gear forming member 42 (FIG. 1).

As shown in FIG. 1, disposed on the slide table 22 is a stopper member 50 to which the side end surface portion 42b of the gear forming member 42 contacts when the seat body 10 is rotated counterclockwise to the forwardly facing position (the counterclockwise rotation limit position). The stopper member 50 is composed of a first stopper 51 and a second stopper 52 that are capable of contacting the side end surface portion 42b of the gear forming member 42. When the drive gear 45 is in the boundary position between the rotation gear 42e and the rotation restraining gear 42r, the first stopper 51 contacts the side end surface portion 42b of the gear forming member 42.

When the drive gear 45 further rotates clockwise in the condition that the drive gear 45 is in the boundary position between the rotation gear 42e and the rotation restraining gear 42r, the drive gear 45 meshes with the rotation restraining gear 42r. As described above, the arc center of the rotation restraining gear 42r corresponds to the center of the stationary pin 47, and the side end surface portion 42b of the gear forming member 42 contacts the first stopper 51 (FIG. 1). Thus, upon clockwise rotation of the drive gear 45 that meshes with the rotation restraining gear 42r, the gear forming member 42 rotates counterclockwise about the stationary pin 47 without rotating around the inner ring 32 (as indicated by chain double-dashed lines in FIGS. 1 and 4). As a result, the positioning surface 42s of the gear forming member 42 is spaced from the outer ring 33 of the seat rotation mechanism 30, so that the arc center of the rotation gear 42e of the gear forming member 42 is offset from the rotation center of the outer ring 33 (the rotation center of the seat body 10). Further, when the drive gear 45 moves to a gear end of the rotation restraining gear 42r, the gear forming member 42 moves to a counterclockwise rotation limit position about the stationary pin 47, so that the side end surface portion 42b of the gear forming member 42 contacts the second stopper 52. In this condition, when the seat body 10 is urged to rotate in a clockwise rotation direction by an external force, the drive gear 45 is placed in such a position so as to interfere with the gear forming member 42. As a result, the rotation of the seat body 10 is restrained.

Further, as shown in FIG. 2, an engagement portion 22k is provided to the slide table 22. The engagement portion 22k is engageable with a lower end portion 48d of the movable pin 48 of the gear forming member 42 in the clockwise rotation direction of the seat body 10 when the gear forming member 42 is in the counterclockwise rotation limit position about the stationary pin 47.

When the gear forming member 42 is not in the counterclockwise rotation limit position about the stationary pin 47, the engagement of the lower end portion 48d of the movable pin 48 and the engagement portion 22k of the slide table 22 is canceled.

That is, a position of the gear forming member 42 when the arc center of the rotation gear 42e corresponds to the rotation center of the outer ring 33 (the rotation center of the seat body 10) is referred to as a seat rotation position, and the counterclockwise rotation limit position about the stationary pin 47 corresponds to a rotation restraint position of the present invention. The stationary pin 47, the movable pin 48, the arcuate elongated hole 35m of the rotation table 35, the positioning surface 42s of the gear forming member 42, the second stopper 52 and other elements correspond to a gear rotation mechanism of the present invention. Further, this gear rotation mechanism, the rotation restraining gear 42r and the drive gear 45 correspond to a moving mechanism of the present invention.

The rotation motor 44 that is capable of rotating the drive gear 45 corresponds to an actuator of the present invention.

<Regarding Operation of Vehicle Seat>

Next, operation of the vehicle seat 1 according to this embodiment is described.

In vehicle interior, the seat body 10 is in the forwardly facing position, and the drive gear 45 is positioned at the gear end of the rotation restraining gear 42r. That is, when the gear forming member 42 is positioned at the rotation restraining position and the seat body 10 is urged to rotate in the clockwise rotation direction by the external force, the drive gear 45 is placed in such a position so as to interfere with the gear forming member 42. Further, the lower end portion 48d of the movable pin 48 of the gear forming member 42 engages the engagement portion 22k of the slide table 22 in the clockwise rotation direction of the seat body 10 and other components. That is, clockwise rotation of the seat body 10 is restrained by the drive gear 45, the gear forming member 42, the lower end portion 48d of the movable pin 48 and the engagement portion 22k.

Further, because the side end surface portion 42b of the gear forming member 42 contacts both of the first stopper 51 and the second stopper 52 of the stopper member 50, counterclockwise rotation of the seat body 10 is restrained by the stopper member 50.

In this condition, when a get-off switch (not shown) is then turned on after a right door of the vehicle is opened, the seat body 10 slides longitudinally to the rotation position by means of the longitudinal moving mechanism 20. Further, at this rotation position, the drive gear 45 rotates counterclockwise in FIG. 1. As a result, the drive gear 45 and the rotation restraining gear 42r of the gear forming member 42 mesh with each other, and the gear forming member 42 rotates clockwise in FIGS. 1 and 4 about the stationary pin 47 by the rotational force of the drive gear 45. While the drive gear 45 and the rotation restraining gear 42r mesh with each other, the seat body 10 is maintained in the forwardly facing position. Further, as shown in, for example, FIG. 1, when the drive gear 45 moves to the boundary position between the rotation restraining gear 42r and the rotation gear 42e of the gear forming member 42, the positioning surface 42s of the gear forming member 42 contacts the outer surface of the outer ring 33 of the seat rotation mechanism 30. In this condition, the arc center of the rotation gear 42e of the gear forming member 42 corresponds to the rotation center of the seat body 10, and the gear forming member 42 is maintained in the seat rotation position. That is, rotational restraint of the seat body 10 in the clockwise rotation is canceled.

Further, when the drive gear 45 continues to rotate counterclockwise, the drive gear 45 meshes with the rotation gear 42e, so that the gear forming member 42 and the outer ring 33 of the seat rotation mechanism 30 rotate clockwise around the inner ring 32 by the rotational force of the drive gear 45. Further, the seat body 10 rotates clockwise together with the rotation table 35. Thus, the seat body 10 rotates to the rightwardly facing position in which the seat body 10 faces a door opening while the drive gear 45 moves to a rear gear end of the rotation gear 42e.

Next, when a get-on switch (not shown) is turned on in a condition that the seat body 10 is in said rightwardly facing position, the drive gear 45 rotates clockwise. As a result, contrary to the above-mentioned motion, the gear forming member 42 and the outer ring 33 of the seat rotation mechanism 30 rotate counterclockwise around the inner ring 32, so that the seat body 10 rotates counterclockwise together with the rotation table 35. Further, when the drive gear 45 moves to the boundary position between the rotation restraining gear 42r and the rotation gear 42e of the gear forming member 42, the seat body 10 and other components are returned to the forwardly facing position. As shown in FIG. 1, in this condition, the side end surface portion 42b of the gear forming member 42 contacts the first stopper 51 of the stopper 50, so that the counterclockwise rotation of the seat body 10 and other components is restrained.

Further, when the drive gear 45 continues to rotate clockwise, the drive gear 45 meshes with the rotation restraining gear 42r of the gear forming member 42, and the gear forming member 42 rotates counterclockwise in FIGS. 1 and 4 about the stationary pin 47. As a result, the positioning surface 42s of the gear forming member 42 is spaced from the outer ring 33 of the seat rotation mechanism 30, so that the arc center of the rotation gear 42e of the gear forming member 42 is offset from the rotation center of the outer ring 33 (the rotation center of the seat body 10). Further, when the drive gear 45 moves to the gear end of the rotation restraining gear 42r, the gear forming member 42 moves to the rotation restraint position, so that the side end surface portion 42b of the gear forming member 42 contacts the second stopper 52. In this way, because the gear forming member 42 is in the rotation restraint position, when the seat body 10 is urged to the clockwise rotation direction by the external force, the drive gear 45 interferes with the gear forming member 42. Further, the lower end portion 48d of the movable pin 48 of the gear forming member 42 engages the engagement portion 22k of the slide table 22 in the clockwise rotation direction of the seat body 10.

That is, the clockwise rotation of the seat body 10 is restrained by the drive gear 45, the gear forming member 42, the lower end portion 48d of the movable pin 48 and the engagement portion 22k. Further, the counterclockwise rotation of the seat body 10 is restrained by the gear forming member 42 and the stopper member 50.

<Advantages of Vehicle Seat according to this Embodiment>

According to the vehicle seat of this embodiment, when the seat body 10 rotates to the forwardly facing position and when the seat body 10 is urged to rotate clockwise while the drive gear 45 is placed in such a position so as to not mesh with the rotation gear 42e, the drive gear 45 is maintained in such a position so as to interfere with the gear forming member 42. That is, the drive gear 45 and the gear forming member 42 interfere with each other, thereby restraining the rotation of the seat body 10.

Thus, a mechanism for rotating the seat body 10 and a mechanism for restraining rotation of the seat body 10 can be partially shared, thereby reducing the number of parts of the vehicle seat. This may lead to a reduced cost of the vehicle seat.

Further, if a clockwise rotational impact is applied to the gear forming member 42 and related components in a condition that the seat body 10 is in the forwardly facing position, the impact cannot be easily applied to the drive gear 45 because the movable pin 48 of the gear forming member 42 and the engagement portion 22k of the slide table 22 engage with each other, Embodiment 2

In the following, a vehicle seat according to Embodiment 2 of the present invention is described with reference to FIGS. 6 to 9. In the vehicle seat of this embodiment, a rotation lock mechanism 60 is added to the seat rotation mechanism 30 of the vehicle seat of the Embodiment 1. However, the vehicle seat of this embodiment has the same construction as the vehicle seat of Embodiment 1.

Figure 6:
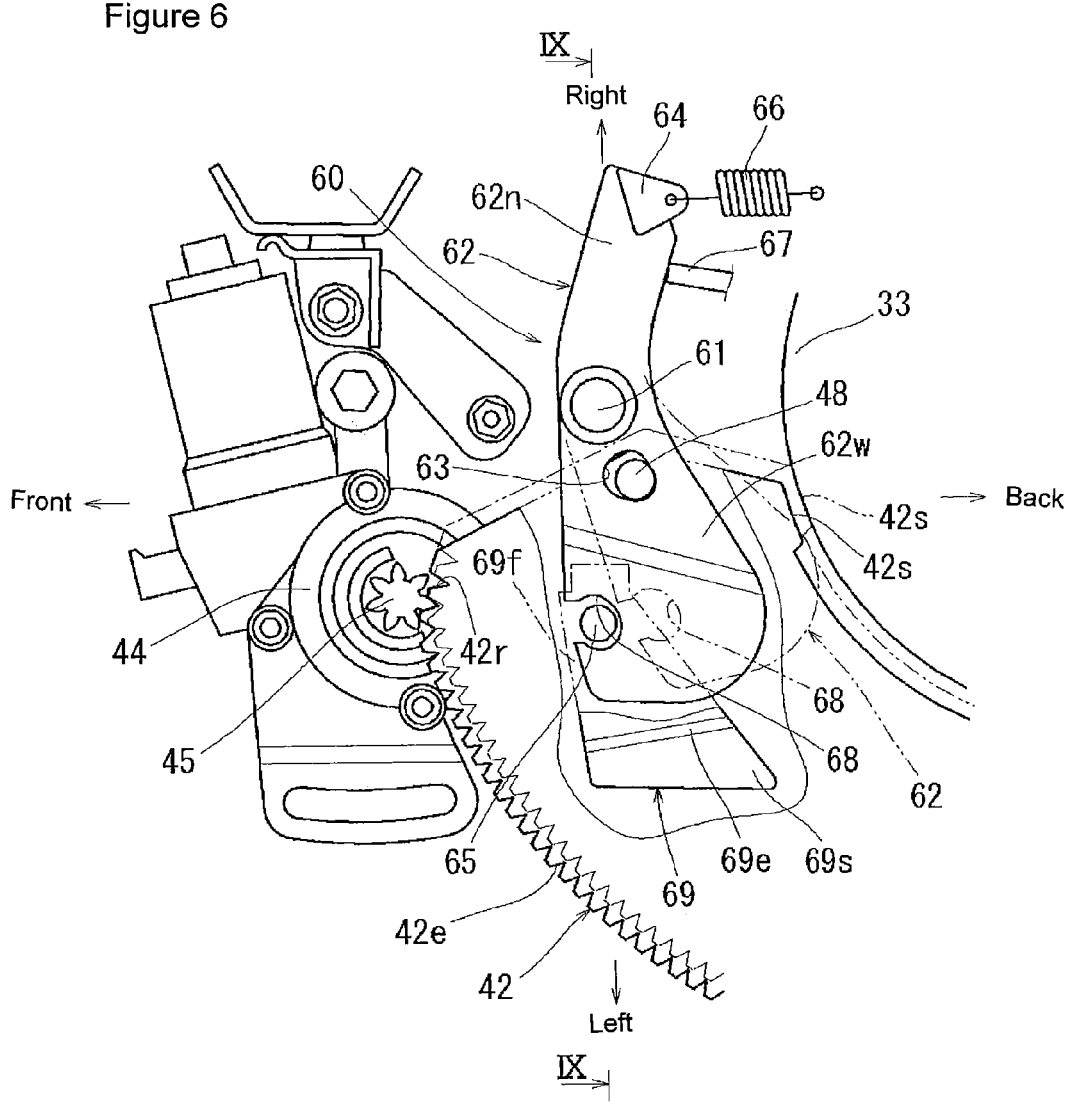
FIG. 6 is a plan view of a rotation lock mechanism and related components of a vehicle seat according to Embodiment 2 of the present invention.
Figure 8:
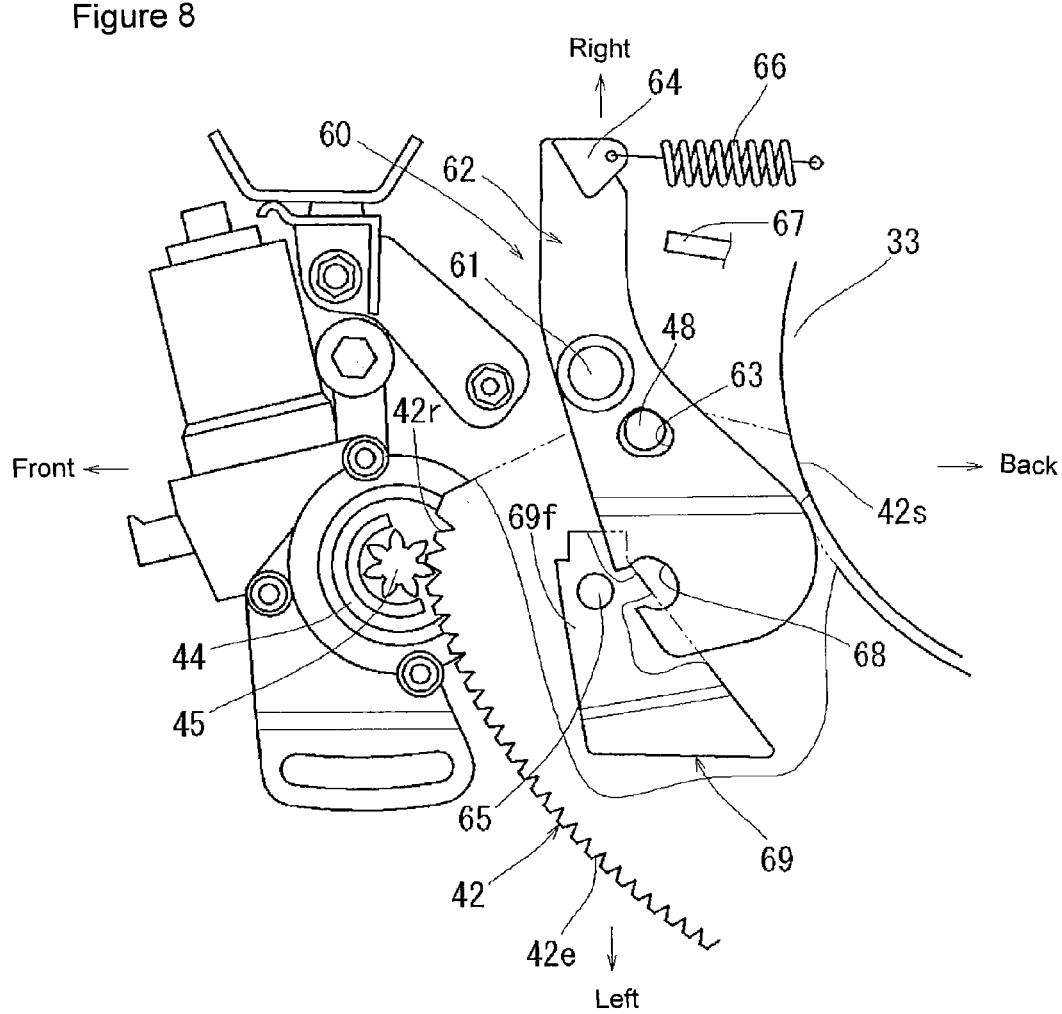
FIG. 8 is a plan view of a rotation lock mechanism and related components of a vehicle seat according to Embodiment 2 of the present invention.
Figure 9:
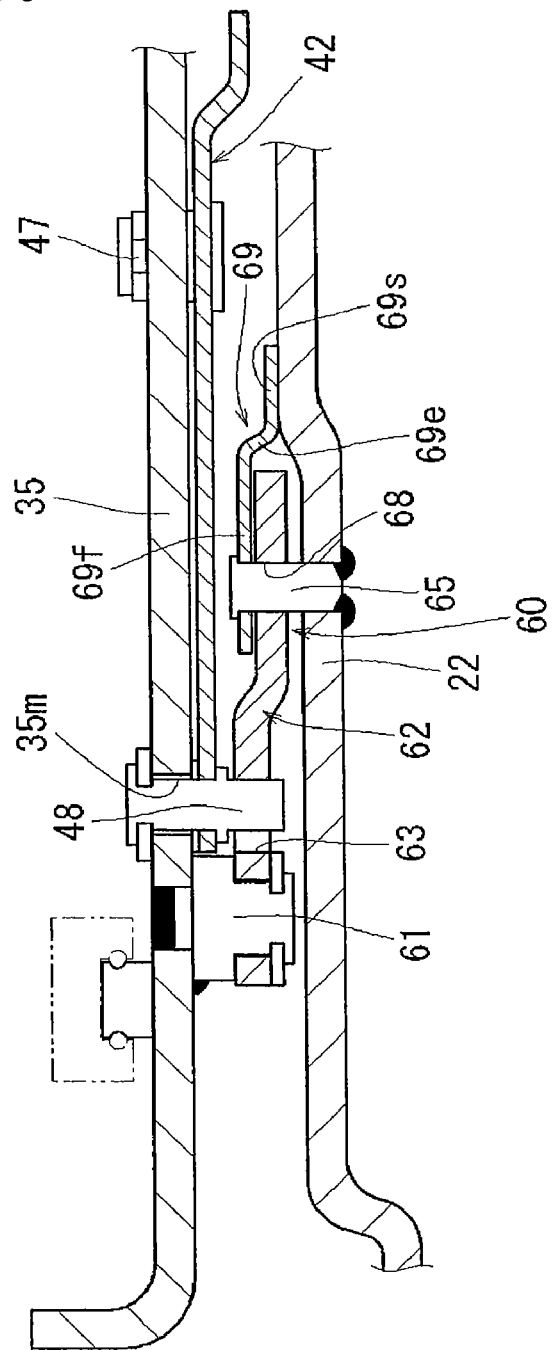
FIG. 9 is a longitudinal sectional view taken along line IX-IX of FIG. 6, which is viewed in a direction of arrows.
Figure 10:
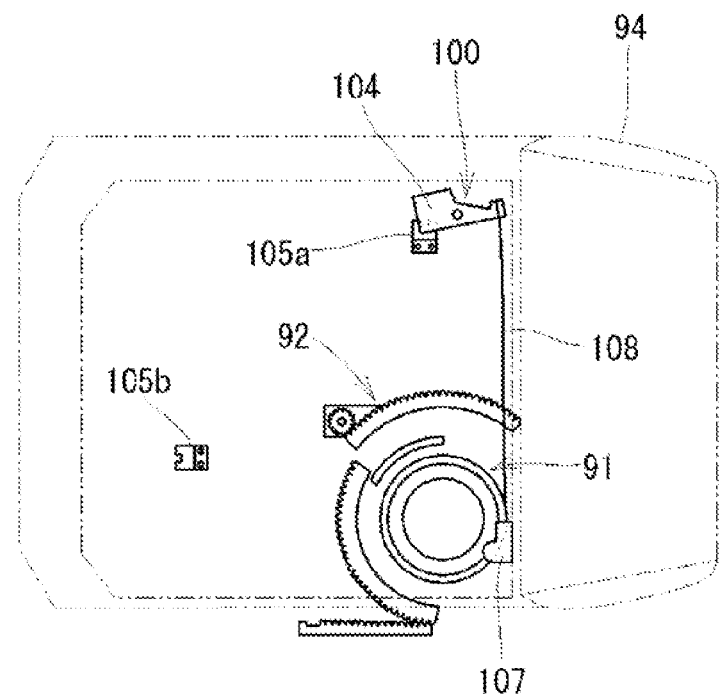
FIG. 10 is a whole schematic plan view of a conventional vehicle seat.

Further, each of FIGS. 6 and 8 is a plan view of a rotation lock mechanism and related components of a vehicle seat of this embodiment. FIG. 9 is a longitudinal sectional view taken along line IX-IX of FIG. 6, which is viewed in a direction of arrows.

<Regarding Rotation Lock Mechanism 60>

As shown in, for example, FIG. 9, the rotation lock mechanism 60 includes a movable member 62 and a stationary member 65. The movable member 62 is horizontally rotatably attached to a lower side of the rotation table 35 via a support pin 61. The stationary member 65 is vertically positioned on the slide table 22 and is constructed to be engageable with the movable member 62. Further, in FIGS. 6 and 8, the rotation table 35 and the slide table 22 are omitted.

As shown in FIGS. 6 and 8, the movable member 62 is a plate member that is curved to a V-shape in a plan view. The movable member 62 is disposed so as to extend in a lateral direction of the seat body 10. The movable member 62 is composed of a narrow portion 62n and a wide portion 62w. The narrow portion 62n is formed so as to extend from a proximal end portion (a right end portion) toward a center of the movable member 62. The wide portion 62w is formed so as to be gradually widened from said center toward a portion closer to a distal end (a left end) of the movable member 62. Further, at a portion substantially corresponding to the center of the movable member 62 is rotatably connected to the rotation table 35 via the support pin 61. As shown in FIG. 9, said support pin 61 has a length greater than the stationary pin 47 that connects the gear forming member 42 to the rotation table 35 and the movable pin 48. The movable member 62 is connected to a distal end portion (a lower end portion) of the support pin 61. As a result, the movable member 62 is positioned below the gear forming member 42.

As shown in FIG. 6, formed in the wide portion 62w of the movable member 62 is a pin opening 63 into which the movable pin 48 of the gear forming member 42 is passed from above. The pin opening 63 is formed in a position closer to the support pin 61. The pin opening 63 is a portion that is capable of transmitting horizontal movement of the movable pin 48 to the movable member 62 when the gear forming member 42 moves between the seat rotation position and the rotation restraint position about the stationary pin 48.

Figure 7:
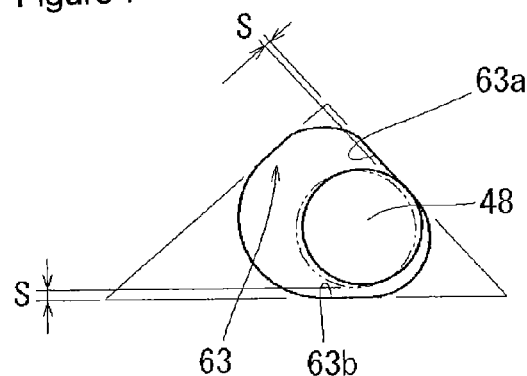
FIG. 7 is a partially enlarged plan view of FIG. 6, which illustrates a portion of a movable pin and a pin opening.

As shown in FIG. 7, the pin opening 63 is a non-circular opening partially including a first straight portion 63a and a second straight portion 63b that correspond to two adjacent sides of a triangle. Further, when the gear forming member 42 moves in a direction of the seat rotation position (a direction indicated by broken lines in FIG. 6) about the stationary pin 48, the movable pin 48 presses the first straight portion 63a of the pin opening 63, so that the movable member 62 rotates counterclockwise about the support pin 61 by a pressing force of the movable pin 48. Further, when the gear forming member 42 moves in a the direction of the rotation restraint position (a direction indicated by solid lines in FIG. 6) about the stationary pin 48, the movable pin 48 presses the second straight portion 63b of the pin opening 63, so that the movable member 62 can rotate clockwise about the support pin 61 by the pressing force of the movable pin 48.

Formed in the proximal end portion (the right end portion) of the narrow portion 62n of the movable member 62 is a spring bearing 64. The spring bearing 64 is connected to one end of a spring 66 that is capable of biasing the movable member 62 toward a clockwise rotation direction. The other end of the spring 66 is connected to a spring bearing (not shown) formed in the rotation table 35. Further, a rotation stopper 67 is provided to a predetermined position of the rotation table 35, so that the movable member 62 applied with a rotational force caused by the spring 66 can be maintained at a clockwise rotation limit position.

Further, formed in the distal end portion of the wide portion 62w of the movable member 62 is a substantially elliptical recess-shaped hook portion 68 that is cut out so as to be open in a front side (a left side in FIG. 6).

Further, as shown in FIG. 6, when the movable member 62 of the rotation lock mechanism 60 rotates horizontally to the clockwise rotation limit position, the hook portion 68 of the movable member 62 thereof can engage the stationary member 65 of the rotation lock mechanism 60 in the rotation direction of the seat body 10.

As shown in FIG. 9, the stationary member 65 is a substantially columnar pin-shaped member and stands upright with respect to the slide table 22. A proximal end portion (a lower end portion) of the stationary member 65 is secured to the slide tale 22. Further, a distal end portion (an upper end portion) of the stationary member 65 is supported via a plate-shaped bracket 69. As shown in FIG. 9, the bracket 69 is composed of a flat plate portion 69f that is parallel to an upper surface of the slide table 22, a step-shaped vertical plate portion 69e and a stationary plate portion 69s that is secured to the upper surface of the slide table 22. The bracket 69 is constructed such that the flat plate portion 69f is positioned higher than the movable member 62 of the rotation lock mechanism 60 when the stationary plate portion 69s is secured to the upper surface of the slide table 22. Further, the distal end portion (the upper end portion) of the stationary member 65 is supported by the flat plate portion 69f of the bracket 69. As a result, the movable member 62 of the rotation lock mechanism 60 rotates through a space between the flat plate portion 69f of the bracket 69 and the upper surface of the slide table 22 to the clockwise rotation limit position in which the movable member 62 can engage the stationary member 65.

<Operation of Vehicle Seat>

Next, operation of the vehicle seat 1 of this embodiment is described.

When the get-off switch (not shown) is turned on in the condition that the seat body 10 is in the forwardly facing position, the seat body 10 slides longitudinally to the rotation position, the drive gear 45 rotates counterclockwise in FIG. 6 in this rotation position. As a result, the drive gear 45 and the rotation restraining gear 42r of the gear forming member 42 mesh with each other, so that the gear forming member 42 rotates clockwise in FIG. 6 about the stationary pin 47 (FIG. 1) by the rotational force of the drive gear 45 (i.e., moves in the direction indicated by chain double-dashed lines). Further, the movable pin 48 of the gear forming member 42 presses the movable member 62 of the rotation lock mechanism 60 in the direction of the outer ring 33 of the seat rotation mechanism 30 (in the direction indicated by chain double-dashed lines) at the position of the first straight portion 63a of the pin opening 63. As a result, the movable member 62 of the rotation lock mechanism 60 rotates counterclockwise about the support pin 61 against a resilient force of the spring 66.

Further, as shown in FIG. 8, when the drive gear 45 moves to the boundary position between the rotation restraining gear 42r and the rotation gear 42e of the gear forming member 42, the positioning surface 42s of the gear forming member 42 contacts the outer surface of the outer ring 33 of the seat rotation mechanism 30. In this condition, the arc center of the rotation gear 42e of the gear forming member 42 corresponds to the rotation center of the seat body 10, and the gear forming member 42 is maintained at the seat rotation position. Further, the hook portion 68 of the movable member 62 of the rotation lock mechanism 60 and the stationary member 65 are placed in such positions so as to not be engageable with each other in the rotation direction of the seat body 10.

That is, the rotation restraint of the seat body 10 is canceled.

Further, when the drive gear 45 continues to rotate counterclockwise, the drive gear 45 meshes with the rotation gear 42e, so that the gear forming member 42 and the outer ring 33 of the seat rotation mechanism 30 rotate clockwise around the inner ring 32 by the rotational force of the drive gear 45. Further, the seat body 10 rotates clockwise together with the rotation table 35.

Next, when a get-on switch (not shown) is turned on in a condition that the seat body 10 is in said rightwardly facing position, the drive gear 45 rotates clockwise. As a result, contrary to the above-mentioned motion, the gear forming member 42 and the outer ring 33 of the seat rotation mechanism 30 rotate counterclockwise around the inner ring 32, so that the seat body 10 rotates counterclockwise together with the rotation table 35. Further, when the drive gear 45 moves to the boundary position between the rotation restraining gear 42r and the rotation gear 42e of the gear forming member 42, the seat body 10 and other components are returned to the forwardly facing position. Thus, the side end surface portion 42b of the gear forming member 42 (FIG. 1) contacts the first stopper 51 of the stopper 50, so that the counterclockwise rotation of the seat body 10 and other components is restrained.

In this condition, when the drive gear 45 continues to rotate clockwise, the drive gear 45 meshes with the rotation restraining gear 42r of the gear forming member 42, and the gear forming member 42 rotates counterclockwise about the stationary pin 47 (FIG. 1) (i.e., moves from a position indicated by chain double-dashed lines to a position indicated by solid lines in FIG. 6). Further, the movable pin 48 of the gear forming member 42 moves away form the outer ring 33 of the seat rotation mechanism 30. As a result, the movable member 62 of the rotation lock mechanism 60 rotates clockwise about the support pin 61 by the resilient force of the spring 66 so as to follow the movable pin 48. At this time, the first straight portion 63a of the pin opening 63 of the movable member 62 is maintained in a condition that it contacts the movable pin 48 of the gear forming member 42 by the spring 66. Further, even if the spring 66 is damaged, the movable member 62 is capable of rotating clockwise about the support pin 61 because of the second straight portion 63b of the pin opening 63 is pressed by the movable pin 48 of the gear forming member 42.

The wide portion 62w of the movable member 62 that is rotating clockwise about the support pin 61 moves between the upper surface of the slide table 22 and the flat plate portion 69f of the bracket 69 (FIG. 9).

Further, the movable member 62 of the rotation lock mechanism 60 contacts the rotation stopper 67 just before the gear forming member 42 reaches the rotation restraint position (the position shown by solid lines in FIG. 6), so that the movable member 62 is retained in the clockwise rotation limit position. As a result, the movable member 62 (the hook 68) of the rotation lock mechanism 60 and the stationary member 65 are placed in such positions so as to be engageable with each other in the rotation direction of the seat body 10.

In this condition, when the drive gear 45 continues to rotate, the gear forming member 42 rotates counterclockwise about the stationary pin 47 (FIG. 1), so that the movable pin 48 of the gear forming member 42 is spaced from the first straight portion 63a of the pin opening 63 of the movable member 62. Further, when the drive gear 45 moves to the gear end of the rotation restraining gear 42r, the gear forming member 42 is retained in the rotation restraint position (the position indicated by solid lines in FIG. 6). As shown in FIG. 7, in this condition, a gap S is formed between the movable pin 48 of the gear forming member 42 and the first straight portion 63a of the pin opening 63 of the movable member 62. Also, a gap S is formed between the movable pin 48 and the second straight portion 63b of the pin opening 63, so that the gear forming member 42 and the movable member 62 of the rotation lock mechanism 60 are maintained in a non-contact condition.

In this way, because the gear forming member 42 is in the rotation restraint position, when the seat body 10 is urged to rotate clockwise by the external force, the drive gear 45 interferes with the gear forming member 42, so that the rotation of the seat body 10 is restrained. Further, the movable member 62 (the hook 68) of the rotation lock mechanism 60 and the stationary member 65 engage each other, so that a rotation lock function can be performed.

<Advantages of Vehicle Seat of this Embodiment>

According to the vehicle seat of this embodiment, when the gear forming member 42 moves toward the rotation restraint position, the movable member 62 of the rotation lock mechanism 60 disposed on the rotation table 35 moves together with the gear forming member 42 and is placed in such a position so as to be engageable with the stationary member 65 disposed on the slide table 22 in the rotation direction of the seat body 10. As a result, if a rotational force is applied to the seat body 10, for example, when collision of the vehicle happens, the movable member 62 of the rotation lock mechanism 60 engages the stationary member 65, rotation of the rotation table 35 with respect to the slide table 22, i.e., the rotation of the seat body 10 is reliably locked.

Further, in a condition that the gear forming member 42 is in the rotation restraint position, the movable pin 48 of the gear forming member 42 is maintained in a non-contact condition with respect to the movable member 62 that is placed in such a position so as to be engageable with the stationary member 65. Thus, if a collision load is applied to the gear forming member 42 via the seat body 10, for example, when the collision of the vehicle happens, movement of the gear forming member 42 is not transmitted to the movable member 62. Thus, when the collision or the like of the vehicle happens, there is no defect such that the hook portion 68 of the movable member 62 is disengaged from the stationary member 65 by the movement of the gear forming member 42.

Further, the movable member 62 is attached to the rotation table 35 and the stationary member 65 is attached to the slide table 22. Further, the bracket 69 is secured to said slide table 22 and covers the movable member 62 from above so as to not preclude movement of the movable member 62. Thus, if the rotation table 35 is applied with a force that urges to move the rotation table 35 upwardly with respect to the slide table 22, for example, when the collision of the vehicle happens, the movable member 62 provided on the rotation table 35 side is held down by the bracket 69 provided on the slide table 22 side, so that the rotation table 35 and the seat body 10 can be prevented from moving upwardly.

<Modifications of Vehicle Seat>

The present invention is not limited to the embodiments described above and can be modified without departing from the scope of the present invention. For example, in the embodiments, the present invention is applied to a vehicle seat in which the seat body 10 is rotated between the forwardly facing position and the rightwardly facing position. However, a rotation range of the seat body 10 can be changed, if necessary.

Further, in Embodiment 1, the drive gear 45 is disposed on the slide table 22 side, and the gear forming member 42 is disposed on the rotation table 35 side. However, the drive gear 45 can be disposed on the rotation table 35 side, and the gear forming member 42 can be disposed on the slide table 22 side.

Further, in Embodiment 2, the drive gear 45 and the stationary member 65 of the rotation lock mechanism 60 are disposed on the slide table 22 side, and the gear forming member 42 and the movable member 62 of the rotation lock mechanism 60 are disposed on the rotation table 35 side. However, the stationary member 65 of the rotation lock mechanism 60 and other components can be disposed on the rotation table 35 side, and the movable member 62 of the rotation lock mechanism 60 and other components can be disposed on the slide table 22 side.

Further, in the embodiments, the drive gear 45 and the rotation restraining gear 42r mesh with each other, thereby rotating the gear forming member 42 between the seat rotation position and the rotation restraint position. However, it is possible to use, for example, a cylinder or other such elements in order to move the gear forming member 42 between the seat rotation position and the rotation restraint position.

The invention claimed is:

1. A vehicle seat, comprising:
   a seat body;
   a seat rotation mechanism supporting the seat body on a vehicle floor such that the seat body is capable of substantially horizontally rotating between a first position and a second position;
   a gear forming member having an arcuate rotation gear that is arranged such that an arc center thereof corresponds to a rotation center of said seat body;
   a drive gear that is capable of meshing with the rotation gear; and
   an actuator for rotating the drive gear,
   wherein said gear forming member is provided to one of a rotational portion of a seat body side and a stationary portion of a vehicle floor side which portions are capable of rotating relative to each other when the seat body is rotated, wherein said drive gear is provided to the other of the rotational portion and the stationary portion, and wherein the seat body is capable of rotating when said drive gear and said gear forming member are relatively rotated upon rotation of said drive gear, the vehicle seat further including:

a moving mechanism that is capable of relatively moving said drive gear and said gear forming member in a direction of a rotation restraint position such that said drive gear is placed in such a position so as to interfere with said gear forming member when said seat body rotates to said first position and when said seat body is urged to rotate in a direction of said second position while said drive gear is placed in such a position so as to not mesh with the rotation gear.

2. A vehicle seat as defined in claim 1, wherein the moving mechanism comprises a gear rotation mechanism that rotatably supports said gear forming member such that the gear forming member can rotate between a seat rotation position in which an arc center of said rotation gear corresponds to said rotation center and a rotation restraint position in which the gear forming member interferes with said drive gear, and an arcuate rotation restraining gear that is formed in said gear forming member so as to be continuous with said rotation gear, wherein the rotation restraining gear has an arc center that corresponds to a rotation center of said gear forming member, so as to mesh with said drive gear when said seat body rotates to said first position, and wherein said rotation restraining gear is capable of rotating between said seat rotation position and said rotation restraint position when said drive gear is rotated while the drive gear meshes with said rotation restraining gear.

3. A vehicle seat as defined in claim 2, wherein one of said rotational portion and said stationary portion having said drive gear is provided with an engagement portion, and wherein when said seat body is urged to rotate toward the second position while said gear forming member is in said rotation restraint position, the engagement portion engages said gear forming member, thereby restraining rotation of said seat body.

4. A vehicle seat as defined in claim 1, further comprising a movable member that is attached to one of said rotational portion and said stationary portion having said gear forming member, and a stationary member that is attached to the other of said rotational portion and said stationary portion having said drive gear, wherein when said seat body rotates to said first position and said gear forming member moves in the direction of the rotation restraint position with respect to said drive gear by movement of said moving mechanism, said movable member moves together with said gear forming member and is placed in such a position so as to be capable of engaging said stationary member in a rotation direction of the seat body.

5. A vehicle seat as defined in claim 4, wherein said movable member is connected to said gear forming member while the movable member applied with a resilient force in a direction toward the position in which the movable member is capable of engaging said stationary member, wherein when said gear forming member moves in the direction of the rotation restraint position, said gear forming member moves in a direction of the resilient force, thereby moving said movable member to a position in which the movable member is capable of engaging said stationary member, and wherein when said gear forming member continues to move in the direction of the rotation restraint position with respect to said movable member that reaches the position in which the movable member is capable of engaging said stationary member and is maintained in the position, said gear forming member is spaced from said movable member so that a non-contact condition can be formed.

6. A vehicle seat as defined in claim 4, wherein said movable member is attached to said rotational portion, wherein said stationary member is attached to said stationary portion, wherein a bracket is secured to said stationary portion, and wherein the bracket covers the movable member from above so as to not preclude movement of said movable member and supports said stationary member.

\* \* \* \* \*